United States Patent [19]

Terry

[11] Patent Number: 4,979,153

[45] Date of Patent: Dec. 18, 1990

[54] MOUNTING APPARATUS FOR THE SONIC TRANSDUCER OF A FISH-FINDER

[76] Inventor: Cecil M. Terry, 1905 Berkley Ave., Fort Wayne, Ind. 46815

[21] Appl. No.: 389,954

[22] Filed: Aug. 7, 1989

[51] Int. Cl.$^5$ ...................... G08B 21/00; A01K 79/02
[52] U.S. Cl. ...................................... 367/93; 43/17.1; 340/573; 367/173
[58] Field of Search ................... 367/94, 93, 104, 173, 367/910; 43/17.1; 340/573

[56] References Cited

U.S. PATENT DOCUMENTS

| | | | |
|---|---|---|---|
| 3,123,798 | 3/1964 | Holloway et al. | 367/94 |
| 3,174,127 | 3/1965 | Haslett | 367/87 |
| 3,757,286 | 9/1973 | Richard | 367/94 |
| 3,879,697 | 4/1975 | Richard | 367/94 |
| 3,885,338 | 5/1975 | York | 43/17.1 |
| 4,152,690 | 5/1979 | Veatch | 367/173 |
| 4,538,249 | 8/1985 | Richard | 367/94 |

Primary Examiner—Glen R. Swann, III

Attorney, Agent, or Firm—Jeffers, Hoffman & Niewyk

[57] ABSTRACT

A mounting apparatus for the sonic transducer of a directional Doppler fish-finder includes an elongate tubular control arm and a clamp assembly for attaching the control arm to the side of a boat so as to extend along and pivot about a generally vertical axis. The upper end of the control arm includes a pivotally mounted control lever, and the lower end includes a pivotally mounted transducer mounting plate to which the transducer is attachable. The control lever and the mounting plate are interconnected by a pair of cables extending through the tubular control arm, whereby pivotal movement of the control lever causes pivotal movement of the mounting plate about a generally horizontal axis. Pivotal movement of the mounting plate about both the vertical and horizontal axes enables a fisherman to direct the sonic signal of the transducer in a locus of directions representing semispherical coverage of the water about the boat.

15 Claims, 3 Drawing Sheets

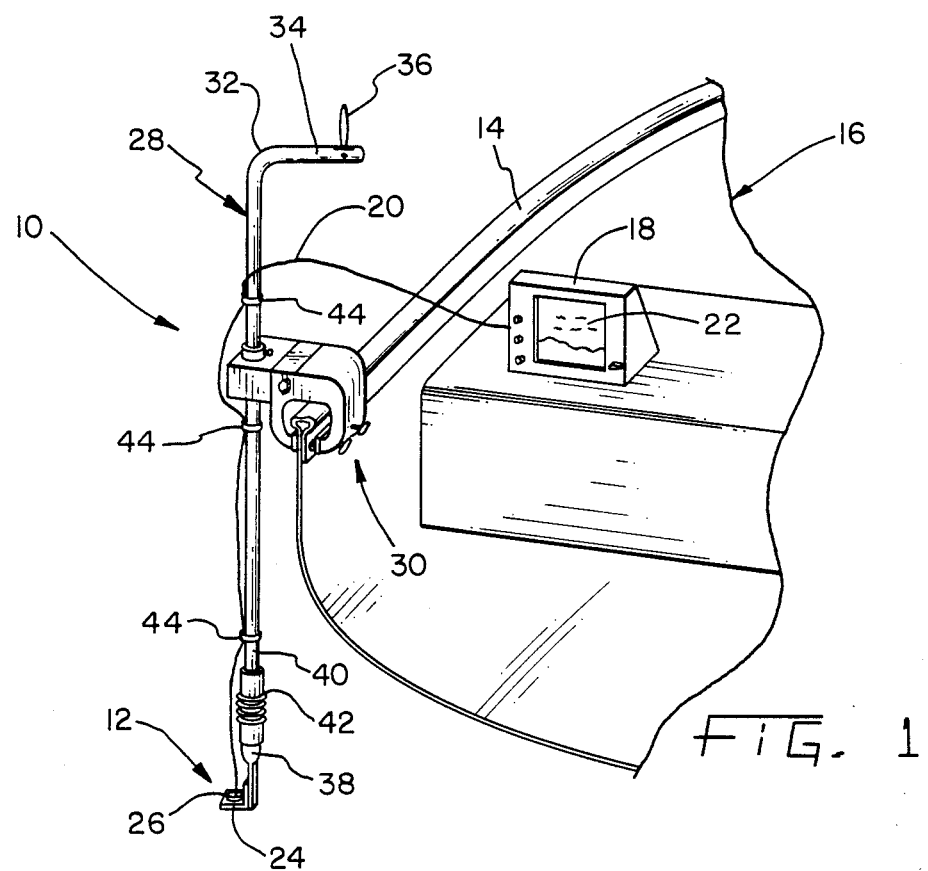
FIG. 1
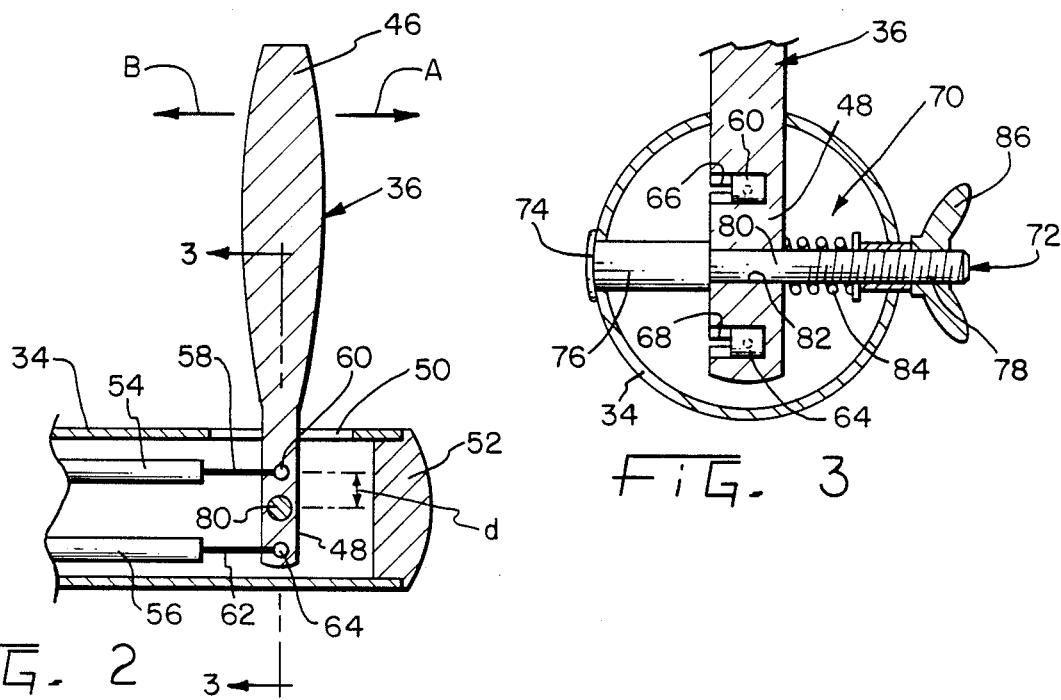
FIG. 2
FIG. 3

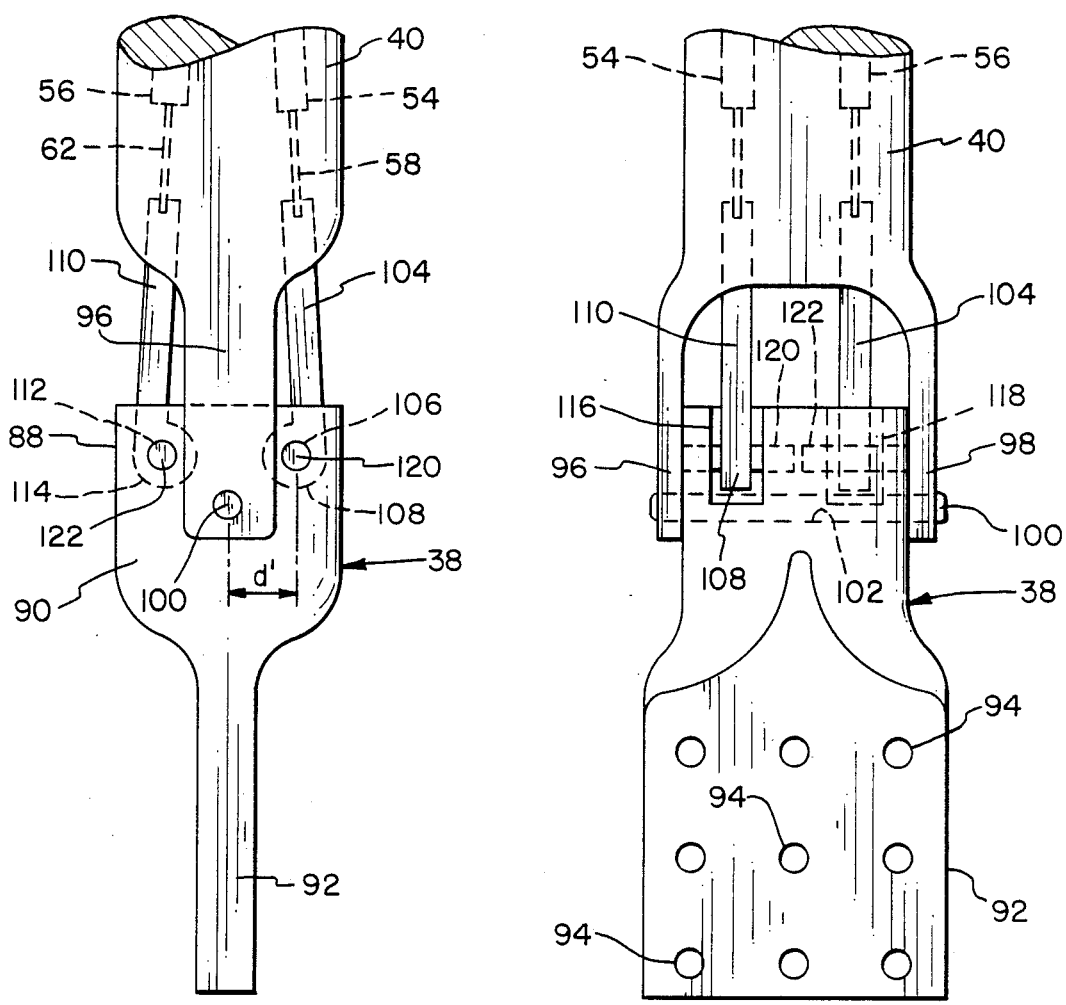
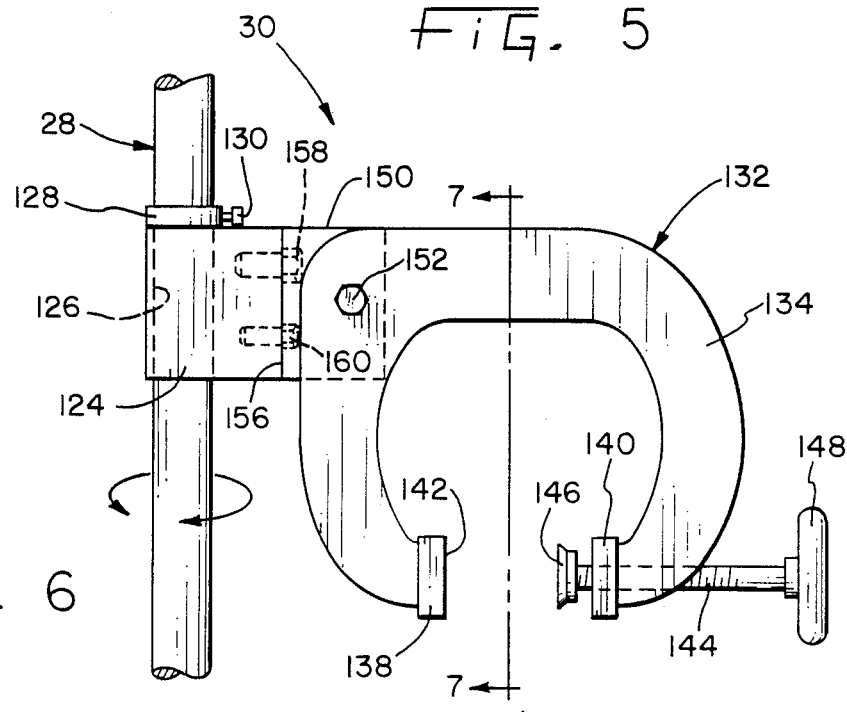

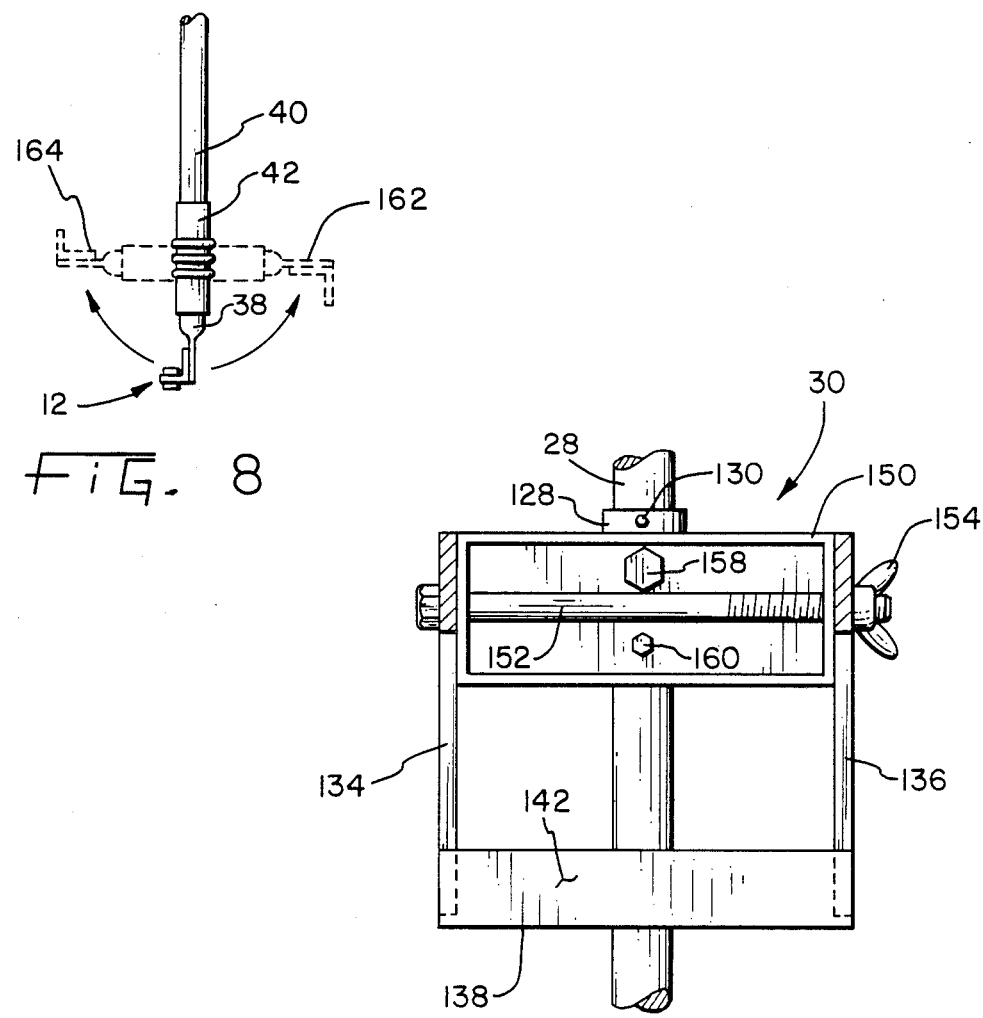

MOUNTING APPARATUS FOR THE SONIC TRANSDUCER OF A FISH-FINDER

BACKGROUND OF THE INVENTION

The present invention relates generally to fish detecting equipment of the type commonly used by fishermen to detect the presence and movement of fish in the vicinity of a fishing boat and, more particularly, to a Doppler fish-finder utilizing a directional sonic transducer.

Most commercially available fish detecting systems operate on the well-known "Doppler" principle, wherein a sonic signal is transmitted in a directional beam into surrounding water by means of a transmitting transducer. Sonic signals from the surrounding water resulting from reflections of the transmitted signal are received by a directional receiving transducer. Typically, the transmitting and receiving transducers are combined within a single directional transducer assembly If a reflected signal is received from a moving object in the surrounding water, the return signal will be shifted in frequency because of the "Doppler" effect. By electronically processing the frequency shift, the fisherman is provided with information concerning the presence and general location of a moving fish and objects within the beam of the transmitted sonic signal.

Prior art directional Doppler detection systems have become very popular with fishing enthusiasts, both amateur and professional. However, the utility of these prior art systems has been limited to some extent by the characteristic narrow beam directional transducer and the method of mounting it to the fishing boat. Typically, the transducer is mounted to the hull of the boat either temporarily, as by a suction cup, or permanently, as by a bracket attached to the boat. In either case, the transmission beam is directed downwardly. Consequently, the area of coverage is small and can only be expanded by moving the boat.

In U.S. Pat. No. 3,123,798, issued to Holloway et al, a portable fish-finder is disclosed including a directional transducer mounted to the end of a suitable handle. The angle between the transducer and the handle is selectively fixed by means of a bolt and wing nut that couple the two parts together. Although the disclosed handle arrangement permits the operator to direct the transducer beam to some extent, the apparatus must be held during use. Furthermore, no indication of the beam orientation is provided the operator.

The ultrasonic Doppler fish detector disclosed in U.S. Pat. No. 4,538,249, issued to Richard, provides for radial detection coverage with a directional transducer by mounting the transducer to a rotatable vertical shaft that is operably clamped to the side of a boat. In one embodiment, the transducer is attached to the lower drive housing of an electric trolling motor. Likewise, U.S. Pat. No. 3,885,338, issued to York, discloses a signalling apparatus for controlling the movement of pelagic fish, wherein a directional acoustic transducer is mounted to the end of a rotatable vertical shaft that is clamped to the side of a boat. A bearing indicator is provided to indicate the direction of the transmitted beam.

Efforts to overcome the disadvantages associated with narrow beam transducers for Doppler detection systems have also included the development of so-called wide beam and omnidirectional transducers. Although expanded somewhat, the coverage area for each of these types of transducers is still limited to some extent. Also, these special types of transducers are not necessarily compatible with existing directional Doppler detection systems and may require circuit modifications and/or enhancements.

The present invention is directed to overcoming the aforementioned problems associated with prior art fish detecting equipment, wherein it is desired to provide an improved mounting apparatus for the directional sonic transducer of a Doppler fish-finder.

SUMMARY OF THE INVENTION

The present invention overcomes the problems and disadvantages of the above-described prior art fish detecting systems by providing an improved mounting apparatus for the directional sonic transducer of a Doppler fish-finder, wherein the sonic signal is capable of being directed in a locus of directions representing semispherical coverage of the water beneath the boat, thereby enabling a fisherman to use a fish-finder system having a directional sonic transducer to selectively scan the water about the boat.

Generally, the present invention provides a transducer mounting apparatus, wherein the directional sonic transducer of a Doppler fish-finder is attached to a movable plate connected to the submersed end of a control arm mounted to the side of a boat. Controls provided on the upper end of the control arm allow the fisherman to move the plate so as to selectively direct the sonic signal in a locus of directions representing semispherical coverage of the water beneath the boat.

More specifically, the present invention provides, in one form thereof, a transducer mounting apparatus including a control arm mounted to the side of a boat and pivotal about a vertical axis. A transducer mounting plate is pivotally connected to the submersed lower end of the control arm, whereby the plate is pivotal about a horizontal axis in response to pivotal movement of a control lever mounted to the upper end of the control arm. The combined pivotal movement of the control arm about a vertical axis and pivotal movement of the mounting plate about a horizontal axis results in the ability to selectively direct the sonic signal of the transducer attached to the plate in a locus of directions representing semispherical coverage of the water beneath the boat.

An advantage of the transducer mounting apparatus of the present invention is that a fish-finder system having a directional sonic transducer can be used to selectively scan the water about a boat in a locus of directions representing semispherical coverage.

A further advantage of the transducer mounting apparatus of the present invention is that an indication of the direction of the directional sonic signal is provided.

Yet another advantage of the transducer mounting apparatus of the present invention is that a fisherman can follow the movement of fish in the water about the boat by selectively changing the direction of the sonic signal.

A still further advantage of the transducer mounting apparatus of the present invention is that the area of coverage of a directional fish-finder is easily and inexpensively expanded.

Another advantage of the transducer mounting apparatus of the present invention is that a directional fish-finder system can now be used to scan a wider area, without moving the boat associated therewith.

The invention, in one form thereof, provides a transducer mounting apparatus for the transducer of a sonic fish-finder system used by a fisherman to detect the presence of fish in water about a boat, wherein the transducer transmits and receives a directional sonic signal The mounting apparatus includes an elongate control arm having an upper control end and a lower transducer mounting end. A clamp assembly connects the control arm to the boat such that the transducer mounting end is disposed in the water. A movable mounting member to which the transducer is mountable is connected to said transducer mounting end. A control input associated with the control end is actuable by the fisherman to select a desired direction for the directional sonic signal of the transducer. In response to the control input, a control output moves the mounting member such that the sonic signal of the transducer is directed in the desired direction. The control input and the control output are capable of directing the sonic signal in a locus of directions representing semispherical coverage of the water beneath the boat. Accordingly, the fisherman can use a fish-finder system having a directional sonic transducer to selectively scan the water about the boat. In one aspect of the invention, an indicator provides the fisherman with an indication of the direction of the sonic signal.

The invention further provides, in one form thereof, a transducer mounting apparatus including an elongate control arm having an upper control end, a lower transducer mounting end, and an intermediate axial portion. The control arm is connectable to a boat by means of an attachment assembly, such as a clamp, comprising a support member coupled to the intermediate axial portion. The support member pivotally supports the control arm along a generally vertical axis such that the transducer mounting end is disposed in the water and the control arm is capable of pivotal movement about the generally vertical axis. The mounting apparatus also includes a mounting plate to which the transducer is attachable. The mounting plate is pivotally mounted to the transducer mounting end of the control arm and is pivotal about a generally horizontal axis. The mounting plate pivots between an up position in which the sonic signal is directed in a generally horizontal direction and a down position in which the sonic signal is directed in a generally downward direction. A control lever is pivotally mounted to the control end of the control arm and is pivotally movable by the fisherman to position the control lever at a desired angular position for selecting the direction of the sonic signal The control lever is interconnected with the mounting plate for pivotally moving the mounting plate in response to pivotal movement of the control lever. The combination of pivotal movement of the control arm about the generally vertical axis and pivotal movement of the mounting plate about the generally horizontal axis results in the fisherman being able to direct the sonic signal in a locus of directions representing semispherical coverage of the water beneath the boat. Accordingly, a fish-finder system having a directional sonic transducer is able to selectively scan the water about the boat.

BRIEF DESCRIPTION OF THE DRAWINGS

FIG. 1 is a perspective view of an exemplary sonic fish-finder system that incorporates a mounting apparatus in accordance with the principles of the present invention;

FIG. 2 is an enlarged fragmentary sectional view of the handle portion of the mounting apparatus of FIG. 1;

FIG. 3 is an enlarged fragmentary sectional view of the handle portion of the mounting apparatus of FIG. 1, taken along the line 3—3 in FIG. 2 and viewed in the direction of the arrows;

FIG. 4 is an enlarged fragmentary view of the transducer end of the mounting apparatus of FIG. 1;

FIG. 5 is a side view of the transducer end of the mounting apparatus of FIG. 1, as shown in FIG. 4;

FIG. 6 is an enlarged fragmentary view of an intermediate portion of the mounting apparatus of FIG. 1, particularly showing the clamp assembly;

FIG. 7 is a partially sectioned side view of the clamp assembly of the mounting apparatus of FIG. 1, as shown in FIG. 6, taken along the line 7—7 in FIG. 6 and viewed in the direction of the arrows; and FIG. 8 is an enlarged fragmentary view of the transducer end of the mounting apparatus of FIG. 1, particularly illustrating range of forward and backward movement of the transducer mounting bracket in response to corresponding movement of the control lever.

DESCRIPTION OF THE PREFERRED EMBODIMENT

In an exemplary embodiment of the invention as shown in the drawings, and in particular by referring to FIG. 1, there is shown a mounting apparatus 10 for mounting a directional sonic transducer assembly 12 associated with a directional Doppler fish-finder to the side rail 14 of a fishing boat 16. Transducer assembly 12 is electrically connected to a control box 18 by means of an electrical lead 20. Control box 18 contains Doppler circuitry and includes a visual display 22 for indicating the presence and movement of fish in the vicinity of boat 16. Transducer assembly 12 includes an L-shaped bracket 24 and a combination transmitting and receiving transducer 26. In a preferred embodiment of the invention, mounting apparatus 10 is used with a Hummingbird Model #4ID directional Doppler fish-finder, commercially available from Techsonic Industries, Inc. of Alabama.

Mounting apparatus 10, in accordance with the disclosed embodiment of the invention, includes an elongate tubular control arm 28, which is pivotally connected at an intermediate portion thereof to side rail 14 by means of a clamp assembly 30, as will be more particularly described hereinafter. Control arm 28 is constructed of hollow steel tubing and is formed at its upper end with an approximately 90 degree bend 32 to provide a horizontal handle portion 34. Handle portion 34 includes a pivotally mounted control lever 36. A transducer mounting plate 38 is pivotally mounted to a lower end 40 of control arm 28, and pivots in response to pivotal movement of control lever 36, as will be more particularly described hereinafter. A flexible rubber sleeve 42 is connected to and extends between lower end 40 and mounting plate 38 to prevent water from entering hollow control arm 28. A plurality of retaining straps 44 secure electrical lead 20 to control arm 28.

Referring now to FIGS. 2 and 3, control lever 36 includes an operator-accessible upper end 46, and a pivotally supported lower end 48 disposed within hollow handle portion 34. Handle portion 34 includes a top opening 50 through which control lever 36 extends, and an end opening closed by an end cap 52. Lower end 48 is operably coupled to a pair of bowden cables designated for identification purposes as backward cable 54 and forward cable 56. As shown in FIGS. 2 and 3, backward cable 54 includes an inner wire 58 having a terminal bead 60, and forward cable 56 includes an inner wire 62 having a terminal bead 64. Beads 60 and 64 are coupled to control lever 36 by means of respective slotted ferrules 66 and 68 formed therein.

Lower end 48 of control lever 36 is pivotally mounted to handle portion 34 by means or an adjustable mounting assembly 70 that enables an operator to selectively establish a resistance against pivotal movement of control lever 36. More specifically, mounting assembly 70 includes a stud member 72 having a head portion 74 fixedly attached to handle portion 34, as by welding or brazing. Stud member 72 further includes an enlarged shoulder portion 76 adjacent head portion 74 an opposite threaded end portion 78, and an intermediate shaft portion 80. Shaft portion 80 extends through a bearing opening 82 in lower end 48, whereby control lever 36 is journalled for pivotal movement about stud member 72.

Adjustable mounting assembly 70 further includes a resistance-adjustment spring 84 received on threaded end portion 78 and retained thereon by an operator-adjustable retaining nut 86. More specifically, spring 84 is adjustably compressed between nut 86 and lower end 48 of control lever 36, whereby lower end 48 is biased again-t shoulder portion 76 and the resulting friction therebetween provides resistance against pivotal movement of control lever 36. Accordingly, the resistance is varied as retaining nut 86 is axially moved and spring 84 is compressed to produce a different force against lower end 48 against shoulder portion 76. It will be appreciated that the compression force between nut 86 and lower end 84 that is provided by spring 84, may alternatively be provided by other resilient materials, such as a rubber washer or the like.

As is clear from the foregoing description of control lever 36, pivotal movement of upper end 46 thereof in a backward direction, indicated by arrow A in FIG. 2, results in inner wire 58 of backward cable 54 being placed under tension. Likewise, pivotal movement of upper end 46 in a forward direction, indicated by arrow B in FIG. 2, results in inner wire 62 of forward cable 56 being placed under tension. The degree to which pivotal movement of control lever 36 is translated to linear movement of inner wires 58 and 62 depends upon the distance d between the center of shaft portion 80, i.e., the pivot axis, and the point of connection of inner wires 58 and 62 with control lever 36, i.e., the location of ferrules 66 and 68, as shown in FIG. 2.

Referring now to FIGS. 4 and 5, mounting plate 38 includes an upper coupling portion 88, an intermediate cylindrical portion 90, and a lower paddle portion 92. Lower paddle portion 92 includes a plurality of spaced mounting holes 94 extending therethrough, which accommodate mounting of a variety of transducer assemblies thereto Lower end 40 of control arm 28 is formed with a pair of spaced, downwardly extending fingers 96 and 98, between which upper coupling portion 88 of mounting plate 38 is received A pivot pin 100 extends between fingers 96 and 98 and is received through a transverse bore 102 in coupling portion 88 to pivotally connect mounting plate 38 to lower end 40 of control arm 28.

In order to effect pivotal movement of mounting plate 38 in response to corresponding pivotal movement of control lever 36, backward cable 54 and forward cable 56 are coupled to coupling portion 88 in the following manner. The lower end of inner wire 58 is attached to one end of a coupling member 104, which has an opening 106 at a rounded lower end 108 thereof. Likewise, the lower end of inner wire 62 is attached to one end of a coupling member 110, which has an opening 112 at a rounded lower end thereof 114. Rounded ends 108 and 114 are received within respective offset slots 116 and 118 formed in coupling portion 88 of mounting plate 38, and are pivotally coupled to the mounting plate by means of respective pins 120 and 122.

The degree to which linear movement of inner wires 58 and 62 is translated to pivotal movement of mounting plate 38 depends upon the distance $d'$ between the center of pivot pin 100, i.e., the pivot axis, and the point of connection of coupling members 104 and 110 with control coupling portion 88, i.e., the location of pins 120 and 122, as shown in FIG. 4. In the preferred embodiment of the invention, distance d is approximately twice distance $d'$ in order that a given pivotal movement of control lever 36 will produce exaggerated pivotal movement of mounting plate 38, i.e., twice the magnitude. Also, the location of pivot pin 100 relative to pins 120 and 122 is exaggerated in FIG. 4 to illustrate that pivot pin 100 is located slightly out-of-line with pins 120 and 122 to ensure that a pivoting moment of force will still be available when mounting plate 38 is fully pivoted 90 degrees.

Referring now to FIGS. 6 and 7, clamp assembly 30 is shown in accordance with a preferred embodiment of the present invention. Specifically, clamp assembly 30 includes a support block 124 having a vertical guide bore 126 provided therein through which an intermediate portion of control arm 28 extends along a generally vertical axis. Control arm 28 pivots within guide bore 126 and is axially supported on support block 124 by means of a depth adjustment collar 128 equipped with a set screw 130 that engages the control arm. Accordingly, control arm 28 may be axially adjusted to ensure that the transducer mounting end is submersed in the water.

Clamp assembly 30 also includes a clamp 132 which attaches to side rail 14 of fishing boat 16. Clamp 132 comprises a pair of spaced C-shaped members 134 and 136, as best shown in FIG. 7. Members 134 and 136 are joined in spaced relationship by means of cross bars 138 and 140 welded thereto. Cross bar 138 includes an inwardly-facing clamping surface 142, and cross bar 140 includes a pair of clamping screws 144 threadedly extending therethrough, each having a pivotable clamping head 146 and a handle 148.

Clamp assembly 30 further includes a mounting box 150 retained between C-shaped members 134 and 136 of clamp 132 by means of bolt 152 and wing nut 154. More specifically, mounting box 150 is an open ended box having a bottom surface 156 against which support block 124 is mounted by mounting screw 158 and shearing screw 160, both of which extend through bottom surface 156 and are received within threaded holes in support block 124. The combination of support block 124 and mounting box 150 is pivotal about bolt 152 when wing nut 154 is loosened, or when a force is applied to control arm 28 in a direction normal to the side of the boat, e.g., if control arm 28 inadvertently strikes an object while trolling. Also, an inadvertent force applied to control arm 28 in a direction parallel to the longitudinal axis of the boat will cause shearing screw 160 to shear and support block 124 to pivot about mounting screw 158.

In operation of mounting apparatus 10 according to the present invention, pivotal movement of control lever 36 results in corresponding pivotal movement of mounting plate 38 and, hence, transducer assembly 12 and the directional sonic signal associated therewith. More specifically, pivotal movement of control lever 36 in the backward direction, indicated by arrow A in FIG. 2, results in backward pivotal movement of control plate 38 toward the extreme backward position indicated by reference numeral 162 in FIG. 8. Likewise, pivotal movement of control lever 36 in the forward direction, indicated by arrow B in FIG. 2, results in forward pivotal movement of control plate 38 toward the extreme forward position indicated by reference numeral 164 in FIG. 8. Mounting plate 38 is otherwise shown in a downward position in FIG. 8.

It will be appreciated that selective pivotal movement of mounting plate 38 about the general horizontal axis of pivot pin 100, when combined with selective pivotal movement of control arm 28 about a generally vertical axis, results in an operator being able to selectively direct the sonic signal transmitted by transducer 26 in a locus of directions representing semispherical coverage of the water beneath boat 16. It will also be appreciated that such semispherical coverage is obtain with the preferred combination of 180 degree pivoting of mounting plate 38 and 180 degree pivoting of control arm 28. Alternatively, the same coverage may be obtained by 90 degree pivoting of mounting plate 38 and 360 degree pivoting of control arm 38.

Mounting apparatus 10, in accordance with the disclosed embodiment of present invention, provides the operator with an indication of the direction of the directional sonic signal of transducer 26. Specifically, forward and backward pivotal movement of control lever 36 indicates the pivotal direction of mounting plate 38, while handle portion 34 of the control arm indicates the orientation of the plane in which mounting plate 38 is pivoting. Accordingly, handle portion 34 and control lever 36 constitute directional indication means for indicating to the operator the general direction of the sonic signal.

As previously described with respect to the disclosed embodiment, pivotal movement of control lever 36 in the backward and forward directions results in corresponding backward and forward pivotal movement of control plate 38, thereby providing an indication to the operator. Alternatively, the connection of backward cable 54 and forward cable 56 at either control lever 36 or transducer mounting plate 38 could be reversed so that pivotal movement of control lever 36 in one direction would result in pivotal movement of mounting plate 38 in the opposite direction. In this arrangement, the longitudinal axis of control lever 36 corresponds to and indicates to the operator the orientation of the directional sonic signal.

It will be appreciated that the foregoing description of a preferred embodiment of the invention is presented by way of illustration only and not by way of any limitation, and that various alternatives and modifications may be made to the illustrated embodiment without departing from the spirit and scope of the invention.

What is claimed is:

1. In a sonic fish-finder system used by a fisherman to detect the presence of fish in water about a boat, including a transducer for transmitting and receiving a directional sonic signal, a mounting apparatus for mounting the transducer to the boat, comprising:

an elongate control arm including a hollow tubular member having an upper control end and a lower transducer-mounting end;

clamp means for connecting said control arm to the boat such that said transducer-mounting end is disposed in the water;

a movable mounting member connected to said transducer-mounting end, the transducer being mountable to said mounting member;

control input means, associated with said control end and actuable by the fisherman, for selecting a desired direction for the directional sonic signal of the transducer, said control input means including a control lever pivotally mounted to said control end of said control arm and pivotally movable by the fisherman to a desired angular position for selecting the direction of the sonic signal, said control lever being interconnected with said mounting member for pivotally moving said mounting member about a generally horizontal axis in response to pivotal movement of said control lever;

control cable means extending through said hollow tubular member for interconnecting said control lever with said mounting member; and control output means, responsive to said control input means, for moving said mounting member such that the sonic signal of the transducer is directed in said desired direction, said control input means and said control output means being capable of directing the sonic signal in a locus of directions representing semispherical coverage of the water beneath the boat, whereby the fisherman can use a fish-finder system having a directional sonic transducer to selectively scan the water about the boat.

2. The transducer mounting apparatus of claim 1, and further comprising:

directional indication means associated with said control end of said control arm for indicating to the fisherman the general direction of the sonic signal.

3. The transducer mounting apparatus of claim 1, and further comprising:

resistance means for selectively establishing a resistance against pivotal movement of said control lever.

4. The transducer mounting apparatus of claim 1, and further comprising:

a flexible moisture-impervious sleeve adapted to extend between said hollow tubular member and said mounting member to prevent the water from contacting said control cable means.

5. The transducer mounting apparatus of claim 1 in which:

said clamp means connects said control arm to the boat such that said control arm is oriented along a generally vertical axis and is capable of pivotal movement about said generally vertical axis in response to movement of said control end of said control arm by the fisherman.

6. The transducer mounting apparatus of claim 5, and further comprising:

directional indication means for indicating to the fisherman the general direction of the sonic signal, said directional indication means comprising said control end of said control arm and said control lever, said control end indicating angular position of said mounting member about said generally vertical axis, and said control lever indicating angular position of said mounting member about said generally horizontal axis.

7. In a sonic fish-finder system used by a fisherman to detect the presence of fish in water about a boat, including a transducer for transmitting and receiving a directional sonic signal, a mounting apparatus for mounting the transducer to the boat, comprising:

an elongate control arm including a hollow tubular member having an upper control end and a lower transducer-mounting end;

clamp means for connecting said control arm to the boat such that said control arm is oriented along a generally vertical axis with said transducer-mounting end disposed in the water, said clamp means permitting pivotal movement of said control arm about said generally vertical axis;

mounting means for pivotally connecting the transducer to said transducer-mounting end of said control arm, said mounting means including a mounting plate to which the transducer is attachable, said mounting plate being pivotal about a generally horizontal axis between an up position in which the sonic signal is directed in a generally horizontal direction and a down position in which the sonic signal is directed in a generally downward direction;

control means, associated with said control end and actuable by the fisherman, for causing said mounting plate to pivot between said up position and said down position, said control means including a control lever pivotally mounted to said control end of said control arm and pivotally movable by the fisherman to a desired angular position for selecting the direction of the sonic signal, said control lever being interconnected to said mounting plate for pivotally moving said mounting plate; and control cable means extending through said hollow tubular member for interconnecting said control lever with said mounting plate, said control cable means comprising a pair of cables, one of said pair of cables being in tension when said mounting plate is pivotally moved in one direction and the other cable being in tension when the mounting plate is pivotally moved in the other direction;

whereby the combination of pivotal movement of said control arm about said generally vertical axis and pivotal movement of said mounting plate about said generally horizontal axis results in the fisherman's being able to direct the sonic signal in a locus of directions representing semispherical coverage of the water beneath the boat, thereby enabling the use of a fish-finder system having a directional sonic transducer to selectively scan the water about the boat.

8. The transducer mounting apparatus of claim 7, and further comprising:

directional indication means associated with said control end of said control arm for indicating to the fisherman the general direction of the sonic signal.

9. The transducer mounting apparatus of claim 7, and further comprising:

resistance means for selectively establishing a resistance against pivotal movement of said control lever.

10. The transducer mounting apparatus of claim 7, and further comprising:

a flexible moisture-impervious sleeve adapted to extend between said hollow tubular member and said mounting plate to prevent the water from contacting said pair of cables.

11. The transducer mounting apparatus of claim 7 wherein said control arm is capable of pivotal movement about said generally vertical axis in response to movement of said control end of said control arm by the fisherman, and further comprising:

directional indication means for indicating to the fisherman the general direction of the sonic signal, said directional indication means comprising said control end of said control arm and said control lever, said control end indicating angular position of said mounting plate about said generally vertical axis, and said control lever indicating angular position of said mounting plate about said generally horizontal axis.

12. In a sonic fish-finder system used by a fisherman to detect the presence of fish in water about a boat, including a transducer for transmitting and receiving a directional sonic signal, a mounting apparatus for mounting the transducer to the boat, comprising:

an elongate control arm including a hollow tubular member having an upper control end, a lower transducer-mounting end, and an intermediate axial portion;

clamp means for connecting said control arm to the boat, said clamp means comprising support means coupled to said intermediate axial portion for pivotally supporting said control arm along a generally vertical axis such that said transducer-mounting end is disposed in the water and said control arm is capable of pivotal movement about said generally vertical axis;

a mounting plate to which the transducer is attachable, said mounting plate being pivotally mounted to said transducer-mounting end of said control arm and being pivotal about a generally horizontal axis between an up position in which the sonic signal is directed in a generally horizontal direction and a down position in which the sonic signal is directed in a generally downward direction; and a control lever pivotally mounted to said control end of said control arm and pivotally movable by the fisherman to position said control lever at a desired angular position for selecting the direction of the sonic signal, said control lever being interconnected with said mounting plate for pivotally moving said mounting plate in response to pivotal movement of said control lever; and control cable means extending through said hollow tubular member for interconnecting said control lever with said mounting plate, said control cable means comprising a pair of cables, one of said pair of cables being in tension when said mounting plate is pivotally moved in one direction and the other cable being in tension when the mounting plate is pivotally moved in the other direction;

whereby the combination of pivotal movement of said control arm about said generally vertical axis and pivotal movement of said mounting plate about said generally horizontal axis results in the fisherman's being able to direct the sonic signal in a locus of directions representing semispherical coverage of the water beneath the boat, thereby enabling the use of a fish-finder system having a directional sonic transducer to selectively scan the water about the boat.

13. The transducer mounting apparatus of claim 12 wherein said control arm is capable of pivotal movement about said generally vertical axis in response to movement of said control end of said control arm by the fisherman, and further comprising:

directional indication means for indicating to the fisherman the general direction of the sonic signal, said directional indication means comprising said control end of said control arm and said control lever, said control end indicating angular position of said mounting plate about said generally vertical axis, and said control lever indicating angular position of said mounting plate about said generally horizontal axis.

14. The transducer mounting apparatus of claim 12, and further comprising:

resistance means for selectively establishing a resistance against pivotal movement of said control lever.

15. The transducer mounting apparatus of claim 12, and further comprising:

a flexible moisture-impervious sleeve adapted to extend between said hollow tubular member and said mounting plate to prevent the water from contacting said pair of cables.

* * * * *